United States Patent Office
3,652,575
Patented Mar. 28, 1972

3,652,575
PHENYLPYRIDINE-ALKANOLS AND DERIVATIVES THEREOF
Jonathan Hutton and Gilbert Joseph Stacey, Macclesfield, England, assignors to Imperial Chemical Industries Limited, London, England
No Drawing. Filed Sept. 9, 1968, Ser. No. 758,581
Claims priority, application Great Britain, Sept. 26, 1967, 43,677/67
Int. Cl. C07d *31/34*
U.S. Cl. 260—297 R  3 Claims

ABSTRACT OF THE DISCLOSURE

This invention relates to new heterocyclic compounds, and more particularly to new phenyl-heterocyclic-alkanol derivatives, which have anti-inflammatory, analgesic and antipyretic activity.

---

According to the invention we provide heterocyclic compounds of the formula:

$$\underset{X}{\text{Y-Het-Z}}$$

wherein Het stands for a thiazole, isothiazole, oxazole, isoxazole, pyrrole, thiophen, furan, pyridine or pyrimidine ring, X stands for hydrogen or an alkyl or alkoxy radical of not more than 3 carbon atoms, Y stands for the phenyl radical, optionally substituted with not more than 2 halogen atoms, the same or different, or with the p-trifluoromethyl radical, and Z stands for a group of the formula:

wherein $R^1$ and $R^2$, which may be the same or different, stand for hydrogen or an alkyl radical of not more than 3 carbon atoms, and $R^3$ stands for hydrogen, an alkyl radical of not more than 4 carbon atoms, an alkanoyl radical of not more than 5 carbon atoms, the benzoyl radical, a carboxybenzoyl radical, an alkanoyloxybenzoyl or dialkylcyclohexyloxyalkanoyl radical of not more than 12 carbon atoms, or the N-phenylcarbamoyl radical, or $R^3$ stands for an acyl radical of the formula $$R^4—R^5—CR^1R^2—CO—$$

wherein $R^4$ stands for a phenyl, mono- or di-halogenophenyl, or p-trifluoromethylphenyl radical, $R^5$ stands for a thiazolyl, isothiazolyl, oxazolyl, isoxazolyl, pyrrolyl, thienyl, furyl, pyridyl, methylpyridyl, pyrimidyl or methoxypyrimidyl radical, and $R^1$ and $R^2$ have the meanings stated above, and $R^4$ and —$CR^1R^2 \cdot CO$— are linked to non-adjacent ring carbon atoms in $R^5$, and wherein X, Y and Z are linked to ring carbon atoms of Het in such a way that Y and Z are linked to non-adjacent ring carbon atoms thereof, and pharmaceutically-acceptable salts thereof, but excluding 5-(2-hydroxyethyl)-4-methyl-2-phenylthiazole, 3-(2-hydroxyethyl) - 5 - phenylisoxazole, and 5 - (2-hydroxyethyl)-4-methyl-2-phenyloxazole, and pharmaceutically-acceptable salts thereof.

As stated above, in the compounds of this invention, Y and Z are linked to non-adjacent ring carbon atoms in Het. It is to be understood that the corresponding radicals in the heterocyclic starting materials used in the processes of this invention are likewise linked to non-adjacent ring carbon atoms of Het. It is further to be understood that, when $R^1$ and $R^2$ are different, the compounds are racemic and they can be resolved by standard procedures to give the corresponding d- and l-isomers. Compounds wherein Y contains one or two substituents(s), as described above, constitute a preferred embodiment of the invention because, generally speaking, they are more active than the corresponding unsubstituted derivatives.

As a suitable value for X there may be mentioned, for example, hydrogen or the methyl or methoxy radical. The halogen substituent(s) in Y may be selected from, for example, fluorine, chlorine and bromine atoms.

As a suitable value for $R^1$ or $R^2$ there may be mentioned, for example, hydrogen or the methyl radical. As a suitable value for $R^3$ there may be mentioned, for example, hydrogen or the methyl, acetyl, propionyl, benzoyl, o-carboxybenzoyl, o-acetoxybenzoyl, α - (2 - isopropyl-5-methylcyclohexyloxy)acetyl, 2 - (4-chlorophenyl)thiazol-4-ylacetyl or N-phenylcarbamoyl radical.

As suitable salts there may be mentioned nontoxic pharmaceutically-acceptable acid-addition salts, for example a hydrochloride or tartrate.

Preferred compounds of this invention are 4-(4-bromophenyl) - 2 - (2-hydroxyisopropyl)thiazole, 2-(4-chlorophenyl) - 5 - (2-hydroxyisopropyl)-6-methylpyridine, and 2-(4-chlorophenyl)-5-(2-hydroxyethyl)thiophen.

According to a further feature of the invention we provide a process for the manufacture of the compounds of the invention wherein $R^3$ stands for hydrogen, and pharmaceutically-acceptable salts thereof, which comprises reducing a compound of the formula:

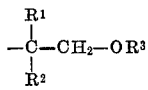

wherein Het, X, Y, $R^1$ and $R^2$ have the meanings stated above, and $R^6$ stands for hydrogen, an alkyl radical of not more than 5 carbon atoms, or an alkoxycarbonyl radical of not more than 5 carbon atoms.

The reduction may be carried out using lithium aluminium hydride in a diluent or solvent, for example diethyl ether or tetrahydrofuran, optionally under the influence of heat. Alternatively, the reduction may be carried out using an alkali metal borohydride in a diluent or solvent, for example ethanol or water, optionally under the influence of heat.

According to a further feature of the invention we provide a process for the manufacture of the compounds of the invention wherein $R^3$ stands for an alkanoyl radical of not more than 5 carbon atoms, the benzoyl radical, a carboxybenzoyl radical, an alkanoyloxybenzoyl or dialkylcyclohexyloxyalkanoyl radical of not more than 12 carbon atoms, or the N-phenylcarbamoyl radical, or $R^3$ stands for an acyl radical of the formula $$R^4—R^5—CR^1R^2—CO—$$

wherein $R^1$, $R^2$, $R^4$ and $R^5$ have the meanings stated above, and pharmaceutically-acceptable salts thereof, which comprises acylating a compound of the formula:

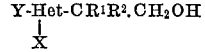

wherein Het, X, Y, $R^1$ and $R^2$ have the meanings stated above.

The acylating agent may be, for example, an acid anhydride or acid halide, and the acylation may be carried out in an carried out in an excess of the acylating agent and/or in the presence of a diluent or solvent, for example pyridine. The interaction involving an acid anhydride or acid halide may be carried out under the influence of heat. Alternatively, the acylation may be carried out using the appropriate carboxylic acid and dicyclohexylcarbodiimide in a diluent or solvent, for example tetrahydrofuran. In the case where $R^3$ stands for the N-phenylcarbamoyl radical, the acylation may be carried out using phenyl isocyanate as the acylating agent, optionally in the presence of an inert diluent or solvent, for example benzene.

According to a further feature of the invention we provide a process for the manufacture of the compounds of the invention wherein R³ stands for an alkyl radical of not more than 3 carbon atoms, and pharmaceutically-acceptable salts thereof, which comprises alkylating the corresponding compound wherein R³ stands for hydrogen. The alkylation may be carried out by reacting the appropriate compound wherein R³ stands for hydrogen with an alkyl halide of not more than 3 carbon atoms, for example methyl iodide, in the presence of an alkali metal or alkali metal hydride, for example sodium or sodium hydride. The reaction may be carried out in a diluent or solvent, for example dimethyl sulphoxide.

According to a further feature of the invention we provide a process for the manufacture of the compound of the invention wherein R¹, R² and R³ stand for hydrogen, and pharmaceutically-acceptable salts thereof, which comprises reacting a Grignard reagent of the formula:

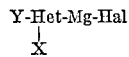

wherein Het, X and Y have the meanings stated above and Hal stands for a chlorine, bromine or iodine atom, with ethylene oxide or an ethylene halogenohydrin and then hydrolysing the resulting complex. The reaction involving the Grignard reagent may be carried out in a diluent or solvent, for example benzene.

It is to be understood that the starting materials used in the processes of this invention may be obtained by conventional methods.

According to a further feature of the invention we provide pharmaceutical compositions comprising at least one heterocyclic compound of the formula:

wherein Het, X, Y and Z have the meanings stated above, or a pharmaceutically-acceptable salt thereof, and an inert, non-toxic, diluent or carrier.

The pharmaceutical compositions may, for example, be in the form of tablets, pills, capsules, suppositories, non-sterile aqueous or non-aqueous solutions or suspensions, sterile injectable aqueous or non-aqueous solutions or suspensions, creams, lotions, or ointments. These compositions may be obtained in conventional manner using conventional excipients. The compositions may optionally contain, in addition to at least one of the heterocyclic compounds which characterise this invention, at least one known agent having anti-inflammatory and/or analgesic activity, for example aspirin, paracetamol, codeine, chloroquine, phenylbutazone, oxyphenbutazone, indomethacin, mefenamic acid, flufenamic acid, ibufenac or an anti-inflammatory steroid, for example prednisolone. Those compositions intended for oral administration may, in addition, optionally contain at least one anti-cholinergic agent, for example homatropine methyl bromide, and/or an antacid, for example aluminium hydroxide. Those compositions designed for topical application may, in addition, optionally contain a vasodilating agent, for example tolazoline, or a vasoconstricting agent, for example adrenaline; a local anaesthetic, for example amethocaine, or a counter-irritant, for example capsicum; and/or at least one agent chosen from the following classes of substances: antibacterial agents, which includes sulphonamides and antibiotics having antibacterial action, for example neomycin; anti-fungal agents, for example hydroxyquinoline; anti-histaminic agents, for example promethazine; and rubefacient agents, for example methyl nicotinate.

The invention is illustrated but not limited by the following examples:

EXAMPLE 1

A solution of ethyl 4-(4-bromophenyl)thiazol-2-ylacetate (13 g.; M.P. 71.5–72.5° C.) in dry ether (120 ml.) was added slowly to lithium aluminium hydride (1.9 g.) stirred in dry ether (70 ml.). The mixture was then stirred and boiled gently under reflux for 1 hour. It was cooled to between 0° C. and 10° C., and water was added dropwise until no more reaction occurred. Additional water was added to permit easy separation of the ether layer. The mixture was separated, the aqueous phase was extracted twice with ether, and the ethereal phase and the two ethereal extracts were combined. The resulting ethereal solution was washed with water, dried over anhydrous sodium sulphate, and evaporated to leave a solid. This was crystallised from carbon tetrachloride to give 4-(4-bromophenyl)-2-(2-hydroxyethyl)thiazole, M.P. 107–109° C.

EXAMPLE 2

Methyl 2-(4-chlorophenyl)thiazol-4-ylacetate (16 g.; M.P. 72° C.) was dissolved in warm dry ethanol (125 ml.), and sodium borohydride (8 g.) was added with stirring. The mixture was refluxed for 1 hour, and water (125 ml.) was then added dropwise to the well-stirred solution. The initial precipitate redissolved to leave a sticky residue which was separately dissolved in hot water (25 ml.). This solution was added to the clear supernatant liquid. The whole clear mixture was cooled to 5–10° C., and water (225 ml.) was added dropwise with vigorous stirring. The emulsion which appeared usually needed seeding with a little of the product before it would readily solidify. The mixture was stirred at 5° C. for one hour, and then filtered. The residual solid was pressed dry on the filter, and was then redissolved as far as possible in warm ethanol (125 ml.). The clear solution was decanted from the sticky insoluble residue. After cooling the clear solution to 5–10° C., water (375 ml.) was added dropwise with vigorous stirring to precipitate the product (again, seeding of the initial emulsion was usually necessary before the precipitate would solidify). The product was filtered off after the mixture had been stirred for one hour at 5° C., and dried in vacuo at 35° C. There was thus obtained 2-(4-chlorophenyl)-4-(2-hydroxyethyl)thiazole, M.P. 66–66.5° C.

EXAMPLE 3

Methyl 2-(4-chlorophenyl) - 4 - methoxypyrimid-6-ylacetate (5 g.; M.P. 78–80° C.) was dissolved in warm dry ethanol (80 ml.), and sodium borohydride (2.5 g.) was added with stirring. The mixture was refluxed for 4 hours, and water (50 ml.) was then added dropwise to the well-stirred solution. The initial precipitate redissolved to leave a sticky residue which was separately dissolved in hot water (25 ml.). This solution was added to the clear supernatant liquor. The mixture was cooled to 5–10° C., and water (75 ml.) was added dropwise with vigorous stirring, seeding or scratching of the resulting emulsion with a little of the product. The mixture was stirred at 5° C. for one hour, filtered, and the solid residue was pressed dry on the filter. The solid was redissolved as far as possible in warm ethanol (70 ml.), and the clear solution was decanted from the sticky residue. After cooling the solution to 5–10° C., water (150 ml.) was added dropwise with vigorous stirring to precipitate the product, which again usually required seeding before it would readily solidify. The mixture was stirred for one hour at 5° C., filtered, and the solid residue was dried in vacuo at 35° C. There was thus obtained 2-(4-chlorophenyl)-4-(2-hydroxyethyl)-6-methoxypyrimidine, M.P. 98° C.

EXAMPLE 4

Methyl 2-(4-chlorophenyl) - 6 - methylpyrid-5-ylacetate (3.3 g.; 75–76° C.) was dissolved in warm dry ethanol (20 ml.), and sodium borohydride (1.6 g.) was added. The mixture was heated to 60° C., and then left stirring to cool during 18 hours. Water (25 ml.) was added to the vigorously stirred reaction mixture, and the sticky residue was redissolved by warming the reaction mixture. After cooling to 5–10° C., more water was added dropwise with stirring until precipitation was complete. The mixture was stirred for 1 hour at 5° C., and then filtered, and the solid residue was dissolved as far as possible in warm ethanol (20 ml.). The mixture was filtered, the filtrate was cooled to 5° C., and the product was precipitated by the dropwise addition of water at 5–10° C. The mixture was filtered and the solid residue was dried in vacuo at 35° C. There was thus obtained 2-(4-chlorophenyl) - 5 - (2-hydroxyethyl)-6-methylpyridine, M.P. 89.5–90° C.

EXAMPLE 5

A mixture of ethyl 2-(4-chlorophenyl)-4-methylthiazol-5-ylacetate (1.57 g.; M.P. 57° C.), sodium borohydride (0.67 g.) and anhydrous ethanol (22 ml.) was refluxed for 2 hours. Water (25 ml.) was added to the hot solution and, after cooling, a sticky residue was deposited. The residue was separated by decantation and dissolved in a little hot water, and the solution was added to the clear mother liquor. The mixture was cooled to 10° C. and water (25 ml.) was added. The mixture was stirred at 10° C. for 2 hours, and then filtered. The solid residue was dissolved as far as possible in warm ethanol (25 ml.), and the mixture was filtered. The filtrate was cooled to 10° C. and water (35 ml.) was added dropwise. The resulting mixture was filtered and the solid residue was dried in vacuo at 35° C. to give 2-(4-chlorophenyl)-5-(2-hydroxyethyl)-4-methylthiazole, M.P. 96° C.

EXAMPLE 6

A mixture of 2-(4-chlorophenyl)-4-(2-hydroxyethyl) thiazole (0.48 g.) and acetic anhydride (0.41 g.) was heated at 100° C. for 18 hours. The mixture was dissolved in chloroform (5 ml.), and the solution was successively washed with water, saturated sodium bicarbonate solution, and water. The chloroform layer was dried with anhydrous magnesium sulphate, and the chloroform was distilled off at a reduced pressure to leave a white solid residue which was crystallised from hexane. There was thus obtained 4-(2-acetoxyethyl)-2-(4 - chlorophenyl)thiazole, M.P. 50–52° C.

EXAMPLE 7

A mixture of 2-(4-chlorophenyl)-4-(2-hydroxyethyl)-thiazole (4.8 g.) and propionic anhydride (5.2 g.) was heated at 100° C. for 18 hours. The reaction mixture was dissolved in chloroform (50 ml.), and the solution was successively washed with water, saturated sodium bicarbonate solution, and water. The chloroform layer was dried with anhydrous magnesium sulphate, and the chloroform distilled off at a reduced pressure to leave a white solid residue which was recrystallised from hexane. There was thus obtained 2-(4-chlorophenyl)-4-(2-propionyloxyethyl)thiazole, M.P. 70–72° C.

EXAMPLE 8

A mixture of dicyclohexylcarbodiimide (4.12 g.) and 2-(4-chlorophenyl)thiazol-4-ylacetic acid (5.07 g.) in anhydrous tetrahydrofuran (10 ml.) was stirred at 0° C. for 30 minutes. 2-(4-chlorophenyl)-4-(2-hydroxyethyl)thiazole (4.79 g.) was dissolved in anhydrous tetrahydrofuran (10 ml.), and the solution was added dropwise with stirring to the above mixture at 0° C. The resulting mixture was stirred at 0° C. for a further 2 hours, and then at ambient temperature for 3 days. The mixture was then filtered, and the filtrate was evaporated to dryness to yield a white solid residue. The solid was dissolved as far as possible in warm cyclohexane (150 ml.), the mixture was filtered while warm, and the filtrate was allowed to cool to ambient temperature. The resulting mixture was filtered to give as solid residue 2-(4-chlorophenyl)-4-[2-(2-/4-chlorophenyl/thiazol - 4 - ylacetoxy)ethyl]thiazole, M.P. 118–119° C.

EXAMPLE 9

A solution of 2-(4-chlorophenyl)-4-(2-hydroxyethyl)-thiazole (3 g.) in dry benzene (25 ml.) was added dropwise with stirring to a solution of phenyl isocyanate (1.48 g.) in dry benzene (5 ml.) at ambient temperature. The mixture was stirred at ambient temperature for 18 hours and then filtered. The solid residue was 2-(4-chlorophenyl)-4-(2-N-phenylcarbamoyloxyethyl)thiazole, M.P. 122–125° C.

EXAMPLE 10

Ethyl 3 - (4 - chlorophenyl)isoxazol-5-ylacetate (2 g.; M.P. 93–94° C.), sodium borohydride (1 g.) and dry ethanol (20 ml.) were mixed and agitated for 16 hours. The mixture was poured into 50 parts of water, made acid with hydrochloric acid, and the resulting mixture was filtered. The solid residue was crystallised from a mixture of benzene and petroleum ether (boiling point 60–80° C.) to give 3-(4-chlorophenyl)-5-(2-hydroxyethyl)isoxazole, M.P. 59–60° C.

EXAMPLE 11

In a similar manner to that described in Example 2 the following compounds were obtained from the appropriate starting materials (cyclohexane was used as the solvent for crystallising products, except where otherwise stated):

4-(4 - bromophenyl) - 2 - (2-hydroxyethyl)thiazole, M.P. 107–109° C.

2 - (4 - bromophenyl) - 4 - (2-hydroxyisopropyl)thiazole, O—H absorption at 3,400 cm.$^{-1}$, no >C=O absorption at 1730 cm.$^{-1}$.

4-(4-bromophenyl)-2-(2-hydroxyisopropyl)thiazole, M.P. 73° C.

2-(4 - bromophenyl)-4-(2-hydroxy-t-butyl)thiazole, M.P. 95° C.

4 - (4-bromophenyl)-2-(2-hydroxy-t-butyl)thiazole, M.P. 76.5° C.

2 - (2,4 - dichlorophenyl) - 4 - (2-hydroxyisopropyl)thiazole, O—H absorption at 3,400 cm.$^{-1}$, no >C=O absorption at 1745 cm.$^{-1}$.

2-(2,4 - dichlorophenyl)-4-(2-hydroxyethyl)thiazole, M.P. 76.5–78° C.

2-phenyl-4-(2-hydroxyisopropyl)thiazole, O—H absorption at 3,400 cm.$^{-1}$, no >C=O absorption at 1750 cm.$^{-1}$.

4 - (4 - chlorophenyl)-2-(2-hydroxy-t-butyl)thiazole, M.P. 55–56° C.

2-(4-chlorophenyl)-5-(2-hydroxyethyl)thiazole, M.P. 85–86° C.

2 - (4 - chlorophenyl) - 5-(2-hydroxyisopropyl)-6-methylpyridine, M.P. 110–111° C.

2-(4-chlorophenyl)-4-(2-hydroxyethyl)oxazole, M.P. 89–90° C.

2-(4-chlorophenyl)-4-(2-hydroxyethyl)pyrrole, M.P. 106–107° C.

3-(4 - chlorophenyl)-5-(2-hydroxy-t-butyl)isoxazole, M.P. 78–79° C.

EXAMPLE 12

To a solution of 2-(4-chlorophenyl)-4-(2-hydroxyethyl)thiazole (1.2 g.) in dry dimethyl sulphoxide (10 ml.) was added a 50% dispersion of sodium hydride in paraffin oil (0.25 g.). The mixture was heated at 40° C. for 15 minutes and cooled to room temperature. Methyl iodide (0.71 g.) in dry dimethyl sulphoxide (2 ml.) was added dropwise with vigorous stirring. The reaction mixture was poured into water (150 ml.) and extracted with ether (3 × 25 ml.). The ethereal extract was dried over anhydrous magnesium sulphate, and the solvent evaporated to give a pale yellow oil which was chromatographed on silica gel (100 g.) using ether/hexane mixtures from 3% to 50%. There was thus obtained as the main fraction 2-(4-chlorophenyl)-4-(2-methoxyethyl)thiazole, M.P. 48–51° C.

EXAMPLE 13

Acetylsalicylyl chloride (7.15 g.), dissolved in dry benzene (25 ml.), was added with stirring and cooling below 20° C. to a solution of 2-(4-chlorophenyl)-4-(2-hydroxyethyl)thiazole (6.3 g.) and triethylamine (7 ml.) in dry benzene (100 ml.). The mixture was stirred and refluxed overnight, diluted with chloroform and the organic phase washed with saturated sodium bicarbonate solution and dried with anhydrous magnesium sulphate. Distillation of the organic solvent under reduced pressure left a red solid which was crystallised from a small volume of ethanol. There was thus obtained 4-(2-acetylsalicylyloxyethyl)-2-(4-chlorophenyl)thiazole, M.P. 99–100° C.

In a similar manner the following compound was obtained from the appropriate starting materials:

4 - (4-bromophenyl)-2-[2-/α-(2-isopropyl-5-methylcyclohexyloxy)acetoxy/isopropyl]thiazole, strong >C=O absorption at 1750 cm.$^{-1}$ and no —O—H absorption at 3,400 cm.$^{-1}$.

EXAMPLE 14

4-(4-bromophenyl) - 2 - (2-hydroxyisopropyl)thiazole (11.92 g.) was dissolved in dry pyridine (64 ml.), and to the solution was added powdered phthalic anhydride (6.2 g.). The mixture was stirred overnight at room temperature and then on the steam bath for one hour. The reaction mixture was poured into a mixture of concentrated hydrochloric acid (82.6 ml.) and ice, and the resulting mixture was extracted with chloroform (3× 25 ml.). The combined chloroform extracts were washed with water, and then evaporated to dryness. The residue was dissolved in an excess of warm dilute ammonium hydroxide, and the solution was cooled to room temperature. The mixture was filtered and the filtrate was acidified with concentrated hydrochloric acid to pH 4. The precipitated oil was extracted with chloroform (3× 25 ml.), and the combined chloroform extracts were dried over anhydrous magnesium sulphate. The solvent was evaporated under reduced pressure, and there was thus obtained the half phthalate ester of 4-(4-bromophenyl)-2-(2-hydroxyisopropyl)thiazole, carboxylic type infrared absorptions between 2,600 and 3,400 cm.$^{-1}$ and at 1680 cm.$^{-1}$. No alcoholic O—H absorption at 3,350 cm.$^{-1}$.

EXAMPLE 15

To a solution of 2-(4-chlorophenyl)thiazol-4-ylacetic acid (1 g.) in tetrahydrofuran (28 ml.) was added an excess (5 molar) of lithium aluminium hydride. After being stirred at room temperature for half an hour, the mixture was refluxed overnight, and then poured into an excess of dilute hydrochloric acid. The resulting clear solution was made alkaline with saturated sodium bicarbonate solution and extracted with ether (3× 10 ml.). The combined ethereal extracts were dried over anhydrous magnesium sulphate, and the solvent evaporated to leave a semi-solid residue. This was crystallised from cyclohexane to yield 2-(4-chlorophenyl)-4-(2-hydroxyethyl)thiazole, M.P. 66–66.5° C.

EXAMPLE 16

A solution of 2-bromo-5-(4-chlorophenyl)thiophen (6.2 g.) in dry ether (30 ml.) was added with stirring to a suspension of magnesium turnings (0.55 g.) in ether (10 ml.). After the reaction had subsided, dry benzene (25 ml.) was added, and then a solution of ethylene oxide (2 ml.) in ether (3 ml.) was added dropwise over 15 minutes. The mixture was stirred for 20 hours at room temperature, and 5 N-hydrochloric acid (40 ml.) was then added. The upper layer was separated from the mixture, washed successively with water (2× 50 ml.) and saturated sodium bicarbonate solution (50 ml.), dried, and the solvent evaporated in vacuo. The solid residue was washed with cold petroleum ether (B.P. 40–60° C.), and crystallised from petroleum ether (B.P. 100–120° C.) to yield 2-(4-chlorophenyl)-5-(2-hydroxyethyl)thiophen, M.P. 96–97° C.

EXAMPLE 17

To a solution of 2-(4-chlorophenyl)thiazol-4-ylacetic acid (0.01 mole) and triethylamine (0.01 mole) in tetrahydrofuran (15 ml.) was added dropwise at —5° C. a solution of ethyl chloroformate (0.01 mole) in tetrahydrofuran (5 ml.) over 15 minutes. After stirring for 30 minutes at —5° C., the triethylamine hydrochloride was filtered off. The filtrate comprised a solution of the mixed anhydride of ethoxyformic acid and 2-(4-chlorophenyl)thiazol-4-ylacetic acid. This solution was added dropwise to an aqueous solution of sodium borohydride (0.03 mole in 10 ml. water) at 10–15° C., and the mixture was stirred at this temperature for 1 hour. The temperature of the mixture was then raised to 30–35° C. until thin layer chromatography indicated that the reduction was complete. The reaction mixture was poured into water (100 ml.), acidified to pH 4 with hydrochloric acid, and extracted with ether (3× 20 ml.). The ethereal extract was dried with anhydrous magnesium sulphate, and the solvent was evaporated to leave a residue which was chromatographed on silica gel using an eluting solvent from 3% to 40% of acetone in cyclohexane. There was thus obtained 2-(4-chlorophenyl)-4-(2 - hydroxyethyl)thiazole, M.P. 66.66–5° C.

EXAMPLE 18

Micronised 2-(4-chlorophenyl)-4-(2-hydroxyethyl)thiazole (100 mg./tablet), lactose (20 mg./tablet), starch (31.6 mg./tablet), calcium phosphate (60 mg./tablet) and polyvinylpyrrolidone (1.25 mg. as a 5% aqueous solution) were milled together, and the mixture was made into tablets with magnesium stearate (2.15 mg./tablet) as a lubricant.

The heterocyclic compounds of this invention are active in the following procedure which is standard in the art for testing for anti-inflammatory activity (Newbould, Brit. J. Pharmacol. Chemotherap., 1963, 21, 127–136).

Adjuvant arthritis in rats

When 0.05 ml. of a fine suspension containing 5 mg./ml. of dead tubercle bacilli in liquid paraffin is injected into the foot-pad of a rat, a primary swelling is produced. This swelling increases in size for three days, and then diminishes slightly until the seventh day, when further swelling occurs. Ten days after the injection, inflamed lesions (which are called secondary lesions) appear in areas of the body which are remote from the actual site of injection; particularly on the joints of the fore-paws, hind-paws and tail. Little further swelling of the feet or joints occurs after the thirteenth day (after the injection). These secondary lesions are considered to have arisen as a result of an immunological reaction involving constituents of the dead tubercle bacilli which became disseminated after injection.

The heterocyclic compounds of this invention have been tested for anti-inflammatory properties as follows:

Each rat in a group of 3 male rats (average weight ca. 200 g.) was dosed orally with the test compound (as an aqueous suspension), and, on the day after dosing, an injection of dead tubercle bacilli was given as above. There was one control group of 3 rats (which received dead tubercle bacilli but no test compound) for every 5 groups of rats receiving test compounds. The test compound was then dosed orally each day until the thirteenth day after the injection of the dead tubercle bacilli. The thickness of the injected foot was measured 3 days after injection and 13 days after injection. The results were expressed as the percentage inhibition of the increase in thickness of the injected feet of the treated rats. The results obtained with a representative selection of the said heterocyclic compounds are shown in the following table (in the cases where the word "Toxic" appears, all the rats died before the thirteenth day after the injection).

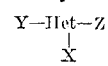

| Het | X (and position on heterocyclic nucleus) | Y (and position on heterocyclic nucleus) | Z (and position on heterocyclic nucleus) | Dose (mg./kg.) | Percent inhibition Day 13 | Percent inhibition Day 3 |
|---|---|---|---|---|---|---|
| Thiazole | H | 4-BrPh (4) | $CH_2CH_2OH$ (2) | 200 (1) | 68 | |
| Thiazole | H | 4-ClPh (2) | $CH_2CH_2OH$ (4) | 400 (1) | Toxic | |
| | | | | 200 (4) | 69 | 47 |
| | | | | 100 (2) | 62 | 30 |
| | | | | 50 (3) | 58 | 44 |
| | | | | 20 (3) | 51 | 39 |
| | | | | 10 (4) | 44 | 37 |
| | | | | 5 (4) | 32 | 28 |
| | | | | 2.5 (1) | 29 | 0 |
| Pyrimidine | MeO (6) | 4-ClPh (2) | $CH_2CH_2OH$ (4) | 200 (1) | 52 | 50 |
| Pyridine | Me (6) | 4-ClPh (2) | $CH_2CH_2OH$ (5) | 200 (1) | 55 | 52 |
| | | | | 10 (1) | 33 | 29 |
| Thiazole | Me (4) | 4-ClPh (2) | $CH_2CH_2OH$ (5) | 200 (1) | 34 | 11 |
| Thiazole | H | 4-ClPh (2) | $CH_2CH_2OCO$—Me (4) | 100 (1) | 67 | 41 |
| | | | | 10 (1) | 39 | 43 |
| | | | | 5 (1) | 31 | 31 |
| Thiazole | H | 4-ClPh (2) | $CH_2CH_2OCOEt$ | 10 (1) | 40 | 54 |
| Thiazole | H | 4-ClPh (2) | —$CH_2CH_2OCO$—$CH_2$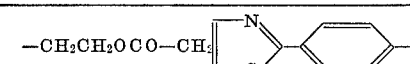—Cl (4) | 100 (1) | 62 | 28 |
| | | | | 10 (1) | 31 | 27 |
| | | | | 5 (1) | 30 | 26 |
| Thiazole | H | 4-ClPh (2) | $CH_2CH_2OCONHPh$ (4) | 100 (1) | 49 | 36 |
| Thiazole | H | 4-BrPh (2) | $CHMeCH_2OH$ (4) | 200 (1) | 52 | 49 |
| | | | | 50 (1) | 64 | 47 |
| | | | | 25 (1) | 43 | 44 |
| | | | | 10 (1) | 51 | 40 |
| Thiazole | H | 4-BrPh (4) | $CHMeCH_2OH$ (2) | 200 (1) | 76 | 52 |
| | | | | 100 (1) | 60 | 20 |
| | | | | 50 (1) | 58 | 34 |
| | | | | 25 (1) | 50 | 26 |
| | | | | 10 (1) | 50 | 36 |
| | | | | 5 (1) | 42 | 21 |
| | | | | 2.5 (1) | 27 | 15 |
| | | | | 1.25 (1) | 31 | 22 |
| Thiazole | H | 4-BrPh (4) | $CMe_2CH_2OH$ (2) | 200 (1) | 49 | 3 |
| | | | | 20 (1) | 33 | 18 |
| Thiazole | H | 2,4-$Cl_2$Ph (2) | $CHMeCH_2OH$ (4) | 200 (1) | 35 | 43 |
| | | | | 50 (1) | 29 | 28 |
| Thiazole | H | 2,4-$Cl_2$Ph (2) | $CH_2CH_2OH$ (4) | 200 (1) | Toxic | |
| | | | | 50 (1) | 38 | 49 |
| Thiazole | H | 4-ClPh (4) | $CMe_2CH_2OH$ (2) | 100 (1) | 52 | 50 |
| | | | | 25 (1) | 45 | 45 |
| | | | | 10 (1) | 29 | 15 |
| Pyridine | Me (6) | 4-ClPh (2) | $CHMeCH_2OH$ (5) | 200 (1) | 74 | 51 |
| | | | | 50 (1) | 50 | 36 |
| | | | | 25 (1) | 46 | 31 |
| | | | | 10 (1) | 49 | 43 |
| | | | | 5 (1) | 39 | 8 |
| | | | | 2.5 (1) | 25 | 0 |
| | | | | 1.25 (1) | 28 | 14 |
| Oxazole | H | 4-ClPh (2) | $CH_2CH_2OH$ (4) | 200 (1) | 54 | 51 |
| | | | | 100 (1) | 51 | 33 |
| | | | | 25 (1) | 51 | 43 |
| | | | | 20 (1) | 50 | 47 |
| | | | | 10 (1) | 36 | 26 |
| | | | | 5 (1) | 35 | 26 |
| Isoxazole | H | 4-ClPh (3) | $CMe_2CH_2OH$ (5) | 200 (1) | Toxic | |
| | | | | 100 (1) | 47 | 56 |
| | | | | 50 (1) | 47 | 37 |
| | | | | 25 (1) | 51 | 32 |
| | | | | 10 (1) | 29 | 20 |
| Thiazole | H | 4-ClPh (2) | $CH_2CH_2OMe$ (4) | 50 (1) | 32 | 37 |
| Thiazole | H | 4-ClPh (2) | $CH_2CH_2OCO$—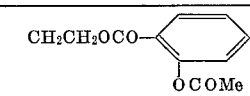(4)<br>OCOMe | 200 (1) | 67 | 41 |
| | | | | 10 (1) | 50 | 24 |
| | | | | 5 (1) | 31 | 13 |
| Thiazole | H | 4-BrPh (4) | $CHMeCH_2OCO$—$CH_2O$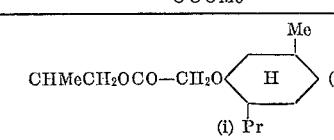(2) | 50 (1) | 40 | 47 |
| Thiophen | H | 4-ClPh (2) | $CH_2CH_2OH$ (5) | 50 (1) | 34 | 35 |
| | | | | 10 (1) | 20 | 17 |
| | | | | 25 (1) | 30 | 26 |

(Figures in parentheses indicate the number of tests of which the results are an average.)

The above results prove that the compounds in question exhibit anti-inflammatory activity in the rat, inasmuch as they prevent the development of inflammation on Day 3 and Day 13. Moreover, toxicity data indicates that the compounds are not undesirably toxic at useful dosage levels.

It is well known and accepted in the art that non-steroidal anti-inflammatory compounds exhibit analgesic and antipyretic activity. The compounds of this invention are non-steroidal and they exhibit anti-inflammatory activity, as evidenced by the above results. Accordingly, it is reasonable to conclude that the heterocyclic compounds of this invention possess analgesic and antipyretic activity.

The compounds of the invention are generically useful in the treatment of warm-blooded animals (including mammals) and, for this purpose, we recommend that said compounds be administered orally, for example in tablet or capsule form, and that the daily dosage be in the range of about 0.75 mg. to 200 mg. per kg. of host. In particular, when one of the said compounds is used in the treatment of man, we recommend that it be administered orally, for example in tablet or capsule form, at a total daily dose of 50 mg. to 900 mg. of said compound per 70 kg. man.

What we claim is:

1. A compound selected from the group consisting of pyridine compounds of the formula:

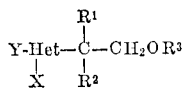

wherein:
Het is a pyridine ring;
X is a member selected from the group consisting of hydrogen, alkyl of not more than 3 carbon atoms, and alkoxy of not more than 3 carbon atoms;
Y is a member selected from the group consisting of phenyl, monohalogenophenyl, dihalogenophenyl and p-trifluoromethylphenyl;
$R^1$ and $R^2$ are members selected from the group consisting of hydrogen and methyl;
$R^3$ is a member selected from the group consisting of hydrogen, alkyl of not more than 4 carbon atoms, alkanoyl of not more than 5 carbon atoms and benzoyl;
and wherein X, Y and —$CR^1R^2CH_2OR^3$ are linked to ring carbon atoms of Het in such a way that Y and —$CR^1R^2CH_2OR^3$ are linked to non-adjacent ring carbon atoms of Het;
and nontoxic, pharmaceutically-acceptable acid-addition salts thereof.

2. A compound as claimed in claim 1 which is 2-(4-chlorophenyl)-5-(2-hydroxyisopropyl)-6-methylpyridine.

3. A compound as claimed in claim 1 which is 2-(4-chlorophenyl)-5-(2-hydroxyethyl)-6-methylpyridine.

References Cited

Kano et al., J. Med. Chem. 10(3), 411 (1967).

HENRY R. JILES, Primary Examiner

G. T. TODD, Assistant Examiner

U.S. Cl. X.R.

260—251 R, 295 R, 302 R, 302 A, 307 R, 307 H, 326.3, 326.5 R, 326.5 N, 332.2 R, 332.3 R, 347.4, 347.8; 424—251, 263, 270, 274, 275, 285